United States Patent [19]

Runciman

[11] 4,263,515
[45] Apr. 21, 1981

[54] VARIABLE TEMPERATURE TEST TARGET

[75] Inventor: Herbert M. Runciman, Glasgow, Scotland

[73] Assignee: Barr & Stroud Limited, Glasgow, Scotland

[21] Appl. No.: 53,061

[22] Filed: Jun. 28, 1979

[30] Foreign Application Priority Data

Jul. 20, 1978 [GB] United Kingdom ............... 30503/78

[51] Int. Cl.³ ............................................. G01J 1/00
[52] U.S. Cl. ................................. 250/494; 250/504 R; 250/503
[58] Field of Search ............... 250/503, 504, 493, 494, 250/495; 313/113, 114; 219/349; 362/303

[56] References Cited
PUBLICATIONS

*Quantum Physics*, Wichmann, pp. 23–24, 1967.

*Primary Examiner*—Bruce C. Anderson
*Attorney, Agent, or Firm*—Mason, Fenwick & Lawrence

[57] ABSTRACT

Apparatus for assessing the thermal sensitivity of optical systems comprises a test target 4 in the form of a plate in which slits 11 are cut at a predetermined spatial frequency. Radiation from a heated bar 1 is reflected from two separate portions thereof on opposite faces A,B of the bar to the test target 4 by concave mirrors 2, 3, radiation from one mirror 3 being reflected by the test target 4 and radiation from the other mirror 2 being transmitted through the slits 11 of test target 4 so that the resulting radiation passes along a common path 9 to a collimator 8 and hence to the optical system under test. The bar 1 may be heated at one end and cooled at the other end such that a temperature gradient is produced along the length of the bar. The above mentioned other mirror 2 is mounted in a movable holder 10 which, by means of a micrometer device 7 can be adjusted along the length of the bar 1 so that the radiation at the test target 4 emerges from portions of the bar 1 which are at different temperatures.

6 Claims, 1 Drawing Figure

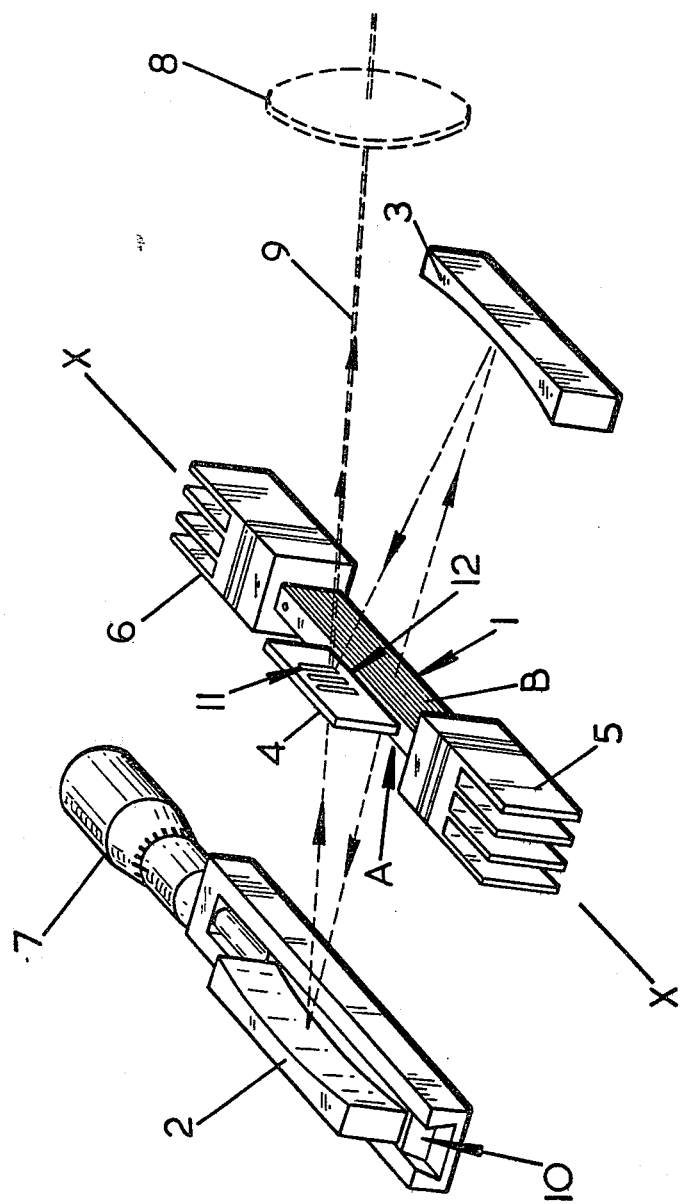

VARIABLE TEMPERATURE TEST TARGET

This invention relates to apparatus for assessing the thermal sensitivity of optical systems, particularly thermal imaging systems.

It is frequently required to measure the temperature sensitivity of thermal imaging systems. This is usually achieved by subjecting the system under test to a radiation test pattern formed by viewing a blackened temperature-controlled element in the form of a plate through a target in the form of a blackened metal plate (held at a fixed temperature) from which slits have been cut corresponding to a predetermined spatial frequency. The temperature of the element behind the target is first raised until the radiation is visible through the target, and the element's temperature is noted. The temperature is then lowered below ambient until the radiation is once more visible through the target, the element's temperature is again noted and the temperature sensitivity at that spatial frequency ("minimum resolvable temperature difference" or MRTD) is taken to be half the temperature difference through which the element was taken. To reduce the size of apparatus which would otherwise be required, the target is commonly viewed through a collimating lens or mirror system so that the target is essentially placed at infinity.

The above system suffers from several disadvantages. The time taken for the element to change temperature and stabilise at a new temperature is considerable and makes measurement very tedious. Moreover, due to the long time lag the temperature of the target plate is liable to variation during the interval, thereby invalidating the readings. A further difficulty arises in controlling the temperature of the element to a sufficient degree of accuracy, which may be as little as $\pm 0.01°$ K. for accurate assessment of a sensitive optical system.

The present invention is intended to overcome these difficulties.

The present invention provides apparatus for assessing the thermal sensitivity of optical systems, comprising a thermally-controlled element controlled so as to have a temperature-gradient in one direction, first and second optical systems respectively arranged to direct black body radiation emanating from sources formed by first and second portions of said element to a common station, a target located at said common station and defining for said radiation alternate transmissive and reflective regions spaced according to a predetermined spatial frequency, the arrangement being such that, in use, the target transmits radiation from said first optical system and reflects radiation from said second optical system along a common path, and adjustment means connected to one of said optical systems so as effectively to vary along said one direction one of said first and second portions relative to the other in order to vary the temperature difference between such sources.

Thus, in the present invention, the blackened spatial frequency test target of the prior art is replaced by a specularly reflective target in the form of a plate from which slits corresponding to the required spatial frequency have been cut, or alternatively by a target in the form of a plate of material transparent to radiation in the spectral region under consideration having a reflective pattern on one of its surfaces. This target is so arranged that the radiation black body which emanates from the thermally-controlled element which is preferably of fairly high thermal conductivity, forms a test pattern caused by some of the radiation passing through the target and some being reflected from it. The temperature difference is achieved by producing a temperature gradient which is preferably uniform in one direction along the element and arranging that the reflected radiation and transmitted radiation come from different portions of the element, the temperature difference being proportional to the spatial separation between the portions of the element from which the reflected and transmitted radiation emanates. Thus the temperature difference or contrast between the components of the test pattern of radiation can be adjusted by mechanical movement of the optics used to direct the radiation, preferably by imaging the element on the target so that selected portions of the element may be made to provide the transmitted and reflected radiation.

An embodiment of the present invention is shown schematically in the drawing.

The temperature controlled element is in the form of a blackened bar 1 which may be heated at one end only, or heated at one end and cooled at the other (for example, by Peltier effect devices 5 and 6) to maintain the mean temperature close to ambient and so that a temperature gradient is set up along the direction x—x. Black body radiation from the bar 1 is imaged by concave mirrors 2 and 3 to a common station 12 where there is located a test target 4 which has the test pattern cut in the form of slits 11 which allow radiation from one side A of the bar 1 to pass to the system under test, while radiation from the other side B of the bar is reflected off the target 4 to the same system along a common path 9. When mirrors 2 and 3 are symmetrically placed and the bar 1 and target 4 are located at conjugate foci, the reflected and transmitted radiation comes from the same part of the bar (as measured along its length), so the temperature difference is zero if there is no temperature gradient across the thickness of the bar. If, however, the mirror 2 which is mounted in a holder 10 is moved in a direction parallel to the longitudinal axis of the bar by means of a micrometer drive 7, the portion of side A of the bar which is imaged on the target 4 is shifted by twice this amount and a temperature difference is introduced. Since black body radiation has an amplitude or intensity profile unique to the temperature of the radiation source, the radiation reflected by the mirrors 2 and 3, while it has the same range of frequencies or wavelengths, has an intensity profile for the radiation incident on mirror 2 which differs from the intensity profile of the radiation incident on mirror 3 if the source on surface A is offset from the source on surface B physically. The micrometer drive 7 for this movement may be calibrated in terms of this temperature difference. If the mirrors 2 and 3 are both moved in opposite directions twice as great a range of temperature differences can be produced. The lens 8 is a collimator lens focussed on the target 4 so that the target is optically located at infinity. In an alternative form the collimator is reflective.

Since the effective temperature difference is controlled by mechanical movement, this system is free of thermal inertia, so that rapid readings can be taken. Also, since the target 4 itself is not emissive, the temperature difference in the radiation test pattern is independent of the target temperature so that test targets for different spatial frequencies may be rapidly interchanged without allowance for temperature stabilisation to take place. An additional advantage is that effective temperature differences very much smaller than that between the ends of the bar may be accurately produced so that relatively modest temperature control of the bar is adequate. The temperature difference between the ends of the bar may conveniently be monitored by thermocouples at each end, and a closed-loop system may be used to keep this constant.

A potential disadvantage of the present system is that because the mirrors 2, 3 image portions of the bar 1 onto the target 4 there is a temperature gradient induced along the test target in addition to the desired temperature difference between the lines and the spaces, but by making the bar 1 long in relation to the length of the target 4 this effect is minimized so as to be negligible. The apparatus may be given variable sensitivity by variation of the temperature gradient along the bar but some time is then required to allow equilibrium to be reached when the range is changed. As with other methods, a collimator lens 8 or mirror may be used to place the target effectively at infinity, care being taken to ensure that its entire aperture is filled by radiation from the bar.

It will now be appreciated that we have described a means of producing a thermal target of variable temperature contrast, said means comprising a thermally emissive bar having a uniform temperature gradient produced along its length, a target in which the desired pattern comprises thermally reflecting areas on a transmitting background, or conversely transmitting areas on a reflecting background, means whereby radiation from a first selected portion of the aforementioned bar may be transmitted through the transmissive portions of the target in such a direction as to be received by the apparatus with which the target is to be viewed, means whereby radiation from a second selected portion of the bar may be reflected from the reflective portions of the target in the same direction as the transmitted radiation, and means whereby the longitudinal position on the bar of one or both of the aforementioned selected portions may be varied in a controlled manner.

What is claimed is:

1. Apparatus for assessing the thermal sensitivity of optical systems, comprising a thermally-controlled element controlled so as to have a temperature-gradient in one direction, first and second optical systems respectively arranged to direct black body radiation emanating from sources formed by first and second portions of said element to a common station, a target located at said common station and defining for said radiation alternate transmissive and reflective regions spaced according to a predetermined spatial frequency, the arrangement being such that, in use, the target transmits radiation from said first optical system and reflects radiation from said second optical system along a common path, and adjustment means connected to one of said optical systems so as effectively to vary along said one direction one of said first and second portions relative to the other in order to vary the temperature difference between said sources.

2. Apparatus as claimed in claim 1 wherein said first and second optical systems each image said radiation at said common station.

3. Apparatus as claimed in claim 2, wherein said first optical system comprises a first concave mirror and said second optical system comprises a second concave mirror.

4. Apparatus as claimed in claim 3 wherein said adjustment means comprises a holder for said first concave mirror and a micrometer adjustment device for varying the position of said holder with respect to a fixed support.

5. Apparatus as claimed in claim 1 wherein said thermally-controlled element is in the form of a thermally-conductive bar the axial length of which is substantially greater than the axial length of said target.

6. Apparatus as claimed in claim 5, wherein said thermally-conductive bar is thermally controlled to have a uniform temperature gradient along its length.

* * * * *